Nov. 5, 1957    R. C. RIKE    2,811,835
POWER BRAKE BOOSTER
Filed July 9, 1953    2 Sheets-Sheet 2
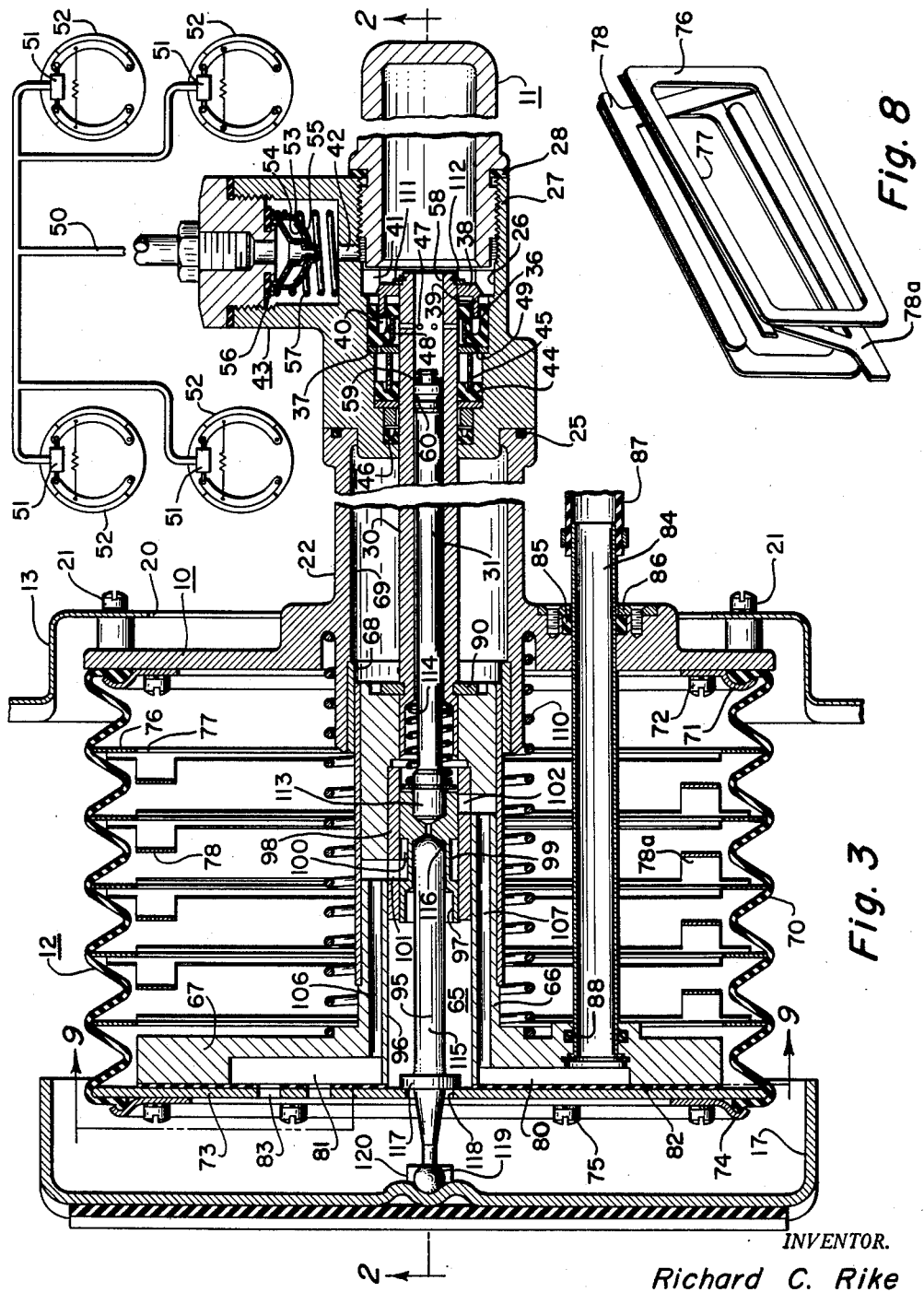
INVENTOR.
Richard C. Rike
BY
His Attorney United States Patent Office 2,811,835
Patented Nov. 5, 1957

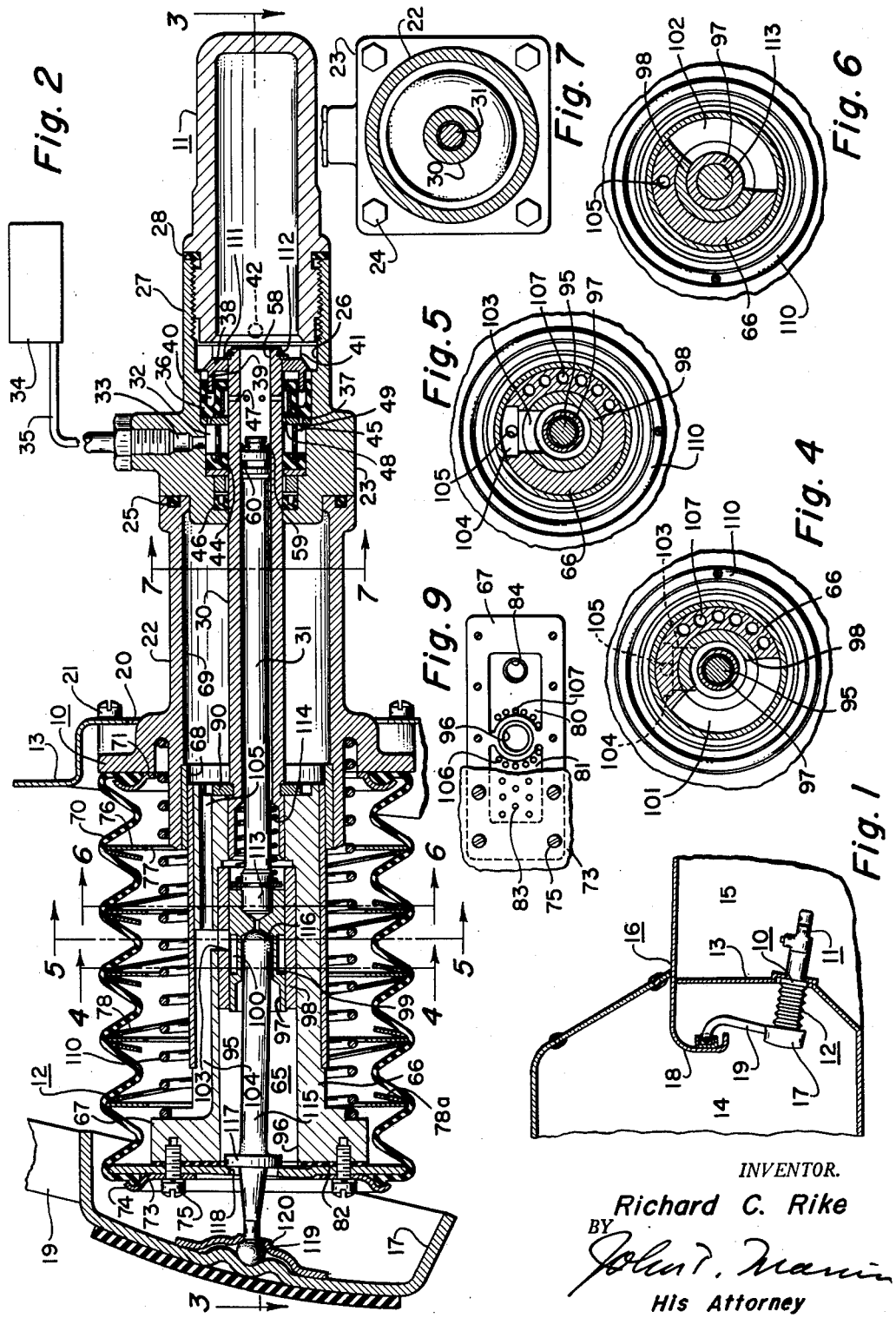

2,811,835

POWER BRAKE BOOSTER

Richard C. Rike, Dayton, Ohio, assignor to General Motors Corporation, Detroit, Mich., a corporation of Delaware Application July 9, 1953, Serial No. 366,915

6 Claims. (Cl. 60—54.6)

This invention relates to power boosters for hydraulic brake systems on automotive vehicles.

The complexity of the modern automobile is becoming greater year by year to the extent that more and more mechanism is being placed under the hood and in the engine compartment of the automobile to the extent that it is becoming extremely difficult to add additional equipment in the engine compartment and still be able to provide access to the equipment for reasonably easy servicing.

Power brakes require a power unit of substantial size, particularly when the power brake is operated by vacuum from the manifold of the engine. Also, it is desirable that the power unit for the brake system be installed as a single unit so that both the power element and the master cylinder for the hydraulic brake system should be capable of installation at one and the same time and at the same place. However, to find room in the engine compartment at the brake pedal level is exceedingly difficult, if not becoming almost impossible for installation of such power equipment.

It is therefore an object of this invention to provide a power unit for a hydraulic brake system that includes a power element and a master cylinder connected therewith that is constructed and arranged in a manner to provide for mounting of the power element within the passenger compartment of the automobile so that only the master cylinder projects into the engine compartment to which the brake lines are attached.

It is also an object of the invention to provide a power unit incorporating the features of the foregoing object but wherein the power unit is placed between the brake pedal and the floor wall with the power unit being directly in the line of action of the brake pedal and movable therewith for concurrent action of the brake pedal and the power unit.

It is still another object of the invention to provide a power unit accomplishing the foregoing objects and also wherein the power element for the power unit comprises a collapsible wall structure that forms the power piston of the power unit, the collapsible wall structure being contractable relative to the floor wall of the automobile to provide for movement of the brake pedal toward the floor wall, the brake pedal and the collapsible wall structure moving concurrently for controlled power operation of the power unit.

Still another object of the invention is to provide a power unit in accordance with the foregoing object wherein the collapsible wall structure is constructed of rubberlike material and is in the form of an accordion type bellows, and also wherein the convolutions of the rubberlike bellows are prevented from transverse collapsing by means of frames positioned within the convolutions.

Further objects and advantages of the present invention will be apparent from the following description, reference being had to the accompanying drawings wherein a preferred form of the invention is clearly shown.

In the drawings:

Figure 1 is a schematic illustration of an automotive vehicle incorporating the power unit of this invention.

Figure 2 is a vertical cross sectional view of the power unit taken along line 2—2 of Figure 3.

Figure 3 is a horizontal cross sectional view taken along line 3—3 of Figure 2.

Figure 4 is a transverse cross sectional view through the control valve structure of the power unit and is taken along line 4—4 of Figure 2.

Figure 5 is a cross sectional view similar to Figure 4 but taken along line 5—5 of Figure 2.

Figure 6 is a cross sectional view similar to Figures 4 and 5 but taken along lines 6—6 of Figure 2.

Figure 7 is a transverse cross sectional view taken along line 7—7 of Figure 2.

Figure 8 is a perspective elevational view of the frame elements provided within the convolutions of the accordion type bellows forming the power element of the structure.

The power unit of this invention comprises a support or mounting base 10 that has a master cylinder 11 on one side thereof and a power element 12 on the opposite side. The mounting base 10 is carried upon a compartment wall 13 of an automotive vehicle, the compartment wall separating the passenger compartment 14 from the engine compartment 15 of the automotive vehicle 16. A brake pedal 17, preferably of the suspended type, covers the forward end of the power unit 12. The brake pedal is suspended from the wall 13 of the motor vehicle through a lever 19.

Placement of the power unit 12 within the passenger compartment of the automotive vehicle and directly in line with the line of action of the brake pedal 17 provides for full utilization of space normally required by the stroke of operation of the brake pedal. Since this space is normally left open as required by brake pedal movement, the placement of the power unit in this space to move concurrently with the brake pedal provides for utilization of a previously wasted space and elimination of a power mechanism from the engine compartment, thus relieving the crowded condition existing in the engine compartment particularly at the brake pedal level. Since the master cylinder 11 is a small item and will be mounted through the compartment wall 13 through the opening 20 provided therein, it is not necessary to provide for any mounting of the master cylinder on the engine side of the compartment wall 13. Also, servicing of the entire unit is conveniently arranged since the entire unit can be removed from the passenger compartment of the motor vehicle.

The supporting base 10 is mounted to the wall 13 by means of screws 21 that thread into the base 10 in suitable threaded openings provided for this purpose.

The mounting base 10 is substantially rectangular in shape and has a cylindrical portion 22 that extends from both sides of the base 10. At one end of the extension 22 there is mounted a body 23 secured thereto by means of bolts 24, an O ring seal 25 being provided between the body 23 and the cylindrical portion 22.

The forward end of the body 23 has a cylindrical chamber 26 having a threaded portion 27 that receives the threaded end of the master cylinder 11. A seal 28 is provided between the body 23 and the master cylinder 11.

A piston member 30 extends through the hollow interior of the cylindrical portion 22 and projects through the body 23 into the master cylinder 11 for movement in the cylinder 11 to place fluid therein under pressure. The piston member 30 has an axial bore that receives a second piston element 31 that is slidable within the piston element 30. The piston means 30 and 31 are effective upon hydraulic liquid in the master cylinder 11 to apply pressure on the same during braking operation.

The body 23 has a chamber 32 from which there extends a passage 33 that connects with a fluid reservoir 34 through a conduit 35.

A primary seal 36 is provided between the body 23 and the piston 30, this seal being made of a rubber-like material. At one side of the seal there is placed a retaining washer 37 and at the other side there is located a bearing element 38 having an extension 39 that provides a spacer for the seal 36. The seal 36 has a plurality of thin webs 40 that are engaged by the extension 39 on the bearing 38 to hold the seal 36 in position.

The bearing 38 provides the bearing for the forward end of the piston element 30 in its reciprocal movement within the master cylinder 11. This bearing 38 has a plurality of notches 41 placed therein to provide for flow of hydraulic fluid into the outlet passage 42 that connects with the brake system through the check valve 43.

A secondary seal 44 is provided around the piston 30 and is spaced from the washer 37 by a perforated ring 45. A seal member 46 is also provided between the body 23 and the piston element 30.

The forward end of the piston element 30 has one or more holes 47 therein through which hydraulic fluid from the master cylinder 11 flows when the holes align with the chamber 48 provided internally of the seal 36. Pressure is relieved from the master cylinder 11 through the holes 47, the chamber 48 and the openings 49 provided in the washer 37.

The check valve 43 provides free flow of hydraulic fluid to the brake line 50 from which the hydraulic fluid is distributed to the wheel cylinders 51 of the brakes 52 in conventional manner. The check valve 43 includes a dish shaped member 53 that has a rubber-like flap valve 54 closing the openings 55 to prevent return flow of fluid from the brake line 50 but to allow free flow of fluid to the brake line 50. A second valve is provided by the dish shaped member 53 seating upon a valve seat 56, the member 53 being retained on the seat 56 by the spring 57. The valve provided by the elements 53 and 56 retains a small amount of pressure in the brake line 50 to avoid entrance of air into the wheel cylinders 51.

The piston element 31 that operates within the internal bore 58 of the piston element 30 has a seal member 59 on the forward end thereof as well as being provided with an O-ring seal 60 to prevent fluid from passing through the bore 58.

The power unit 12 includes a body member 65 that has a cylindrical portion 66 in a generally rectangular portion 67 at one end thereof. The cylindrical portion 66 is journaled in the bearing 68 secured within the internal bore 69 of the cylindrical portion 22 of the base 10 for reciprocal movement within the hollow interior of the cylindrical portion 22 during brake pedal operation hereinafter described. A collapsible wall structure 70 made of a rubber-like material and formed generally in the shape of an accordion type bellows of rectangular cross section has one end thereof secured to the base 10 by means of a retaining plate 71, the plate being held to the base by means of screws 72. The opposite end of the collapsible bellows 70 is carried on a plate 73 and secured thereto by a retaining plate 74 as held by screws 75 threaded into the rectangular portion 67.

In each of the convolutions of the collapsible bellows 70 there is placed a frame member 76 of general rectangular cross section and having the opening 77 to provide for placement of other mechanism internally of the bellows 70. These frame members 76 prevent transverse collapsing of the bellows 70 as would occur upon reduction of pressure within the interior of the bellows during operation of the mechanism as hereafter described.

Other frame members 78 and 78a of a U shape are placed angularly between adjacent convolutions of the bellows 70 in a manner that the cooperating frame elements 78 and 78a are placed in the general arrangement of an X with the open end of one frame element being positioned at one side of the bellows structure and the open side of the other frame element disposed at the opposite side of the bellows structure as more particularly illustrated in Figure 8. These frame members 78 and 78a eliminate rotational twisting of the bellows structure during its longitudinal collapsing.

The rectangular portion 67 of the body 65 thus disposed within the bellows structure 70 has the two chambers 80 and 81 on opposite sides of the axis of the body 65. A gasket 82 seals the chambers from one another.

The chamber 81 is connected with atmosphere through openings 83 provided in the plate 73 and the gasket 82. The chamber 80 connects with a source of vacuum, preferably the manifold of the engine, by means of the pipe conduit 84 that extends through the base 10 and reciprocates relative to the base upon reciprocal movement of the body 65 relative to the base 10. A seal member 85 is placed in the base 10 around the pipe 84 and is secured therein by means of a retaining plate 86. A flexible conduit 87 connects the pipe 84 with the engine manifold. An O ring seal 88 is placed around the pipe 84 in the body portion 67 to prevent loss of vacuum.

The cylindrical body portion 66 of the body 65 is attached to the piston element 30 by means of a fitting member 90 whereby the piston element 30 is caused to reciprocate within the master cylinder 11 upon power reciprocation of the body 65 within the base 10.

An actuating fluid control valve 95 is carried by the body 65 within a bore 96. This control valve 95 includes a piston element 97 that is reciprocable in a sleeve 98 placed within the bore 96. The piston element 97 has an annular groove 99 formed therein that provides a chamber 100 shiftable between an air inlet port 101 and a vacuum inlet port 102 placed in the sleeve 98. The chamber 100 also communicates with a discharge port 103 that connects with a passage 104 in the body portion 66 whereby fluid pressure in either of the passages 101 or 102 can be conducted to the interior of the bellows structure 70. A passage 105 in the body portion 66 communicates with the hollow interior of the cylindrical portion 22 on the base 10 to prevent trapping of gas in the chamber formed therein which would restrict reciprocative movement of the body 65 within the hollow chamber 22.

The port 101 in the sleeve 98 is connected with the chamber 81 by means of a passage 106 in the body portion 66. Similarly the vacuum port 102 is connected with the vacuum chamber 80 by means of a port 107.

A compression spring 110 is placed between the base 10 and the body portion 67 to cause normal extension of the collapsible bellows to the position illustrated in the drawings, the degree of extension of the bellows 70 being limited by the stop ring 111 placed on the forward end of the piston element 30 as retained by the snap ring 112. The stop member 111 engages the bearing element 38 of the piston element 30 during the retraction movement of the piston 30.

The piston element 97 of the control valve 95 receives the end 113 of the piston element 31, a spring 114 retaining the piston element 31 in engagement with the piston 97.

An actuating pin 115 has the forward end thereof engaging a recess 116 provided in the piston 97. This actuating pin 115 has a stop 117 that limits the movement of the piston 97 in a leftward direction as viewed in Figure 2.

The actuating pin 115 extends through an opening 118 in the plate 73 and has a ball 119 on the end thereof retained in a ball socket 120 provided on the underside of the brake pedal 17. Thus, actuation of the brake pedal causes operation of the actuating pin which in turn operates the control valve 95 to regulate power operation of the power unit.

The brake pedal 17 is generally rectangular in shape to cover the free end of the bellows structure 70. Thus placement of the foot of the operator upon the brake pedal 17 will not permit engagement of the power unit 12 by the foot of the operator, the brake pedal fully protecting the power unit at all times.

The operation of the device is such that when the brake pedal 17 is moved in a rightward direction, as viewed in Figure 2, the actuating pin 115 moves the piston element 97 in a right hand direction. This also causes movement of the piston element 31 within the piston 30, but no compression of fluid in the master cylinder occurs because the openings 47 still provide for communication of the interior of the master cylinder with the reservoir 34.

Normally, atmospheric air pressure stands within the interior of the collapsible bellows 70 as conducted thereto through the chamber 81, passage 106, port 101, chamber 100, port 103, and ports 104 and 105. Thus, with atmospheric pressure existing both internally and externally of the bellows 70 the spring 110 normally positions the power element and the pistons 30 and 31 in the position illustrated in the drawings.

As the piston 97 of the control valve 95 moves in a rightward direction upon actuation of the pedal 17, the chamber 100 finally closes off port 101 and immediately thereafter opens the vacuum port 102 whereby the vacuum from the engine manifold is received within the collapsible bellows 70 through the pipe 84, chamber 80, passages 107, port 102, chamber 100, port 103 and ports 104 and 105. When the pressure within the bellows 70 reduces below atmosphere, atmospheric pressure standing against the free end of the bellows 70 causes rightward movement of the body 65. This rightward movement of the body 65 causes movement of the piston element 30 into the master cylinder 11 until the ports 47 pass the end of the seal 36. The power actuation of the bellows 70 causes it to collapse toward the base mounting 10. This movement occurs concurrently with rightward movement of the brake pedal under control of the operator. Thus, pedal movement and collapsing of the bellows 70 occur at the same rate so that the space normally traveled by the pedal is available for pedal movement, the collapsing of the bellows 70 causing the power actuation of the piston 30 within the master cylinder 11. During this operation the piston element 31 also moves at the same rate as the piston element 30 so that so long as the pedal movement is equal to the rate of movement occasioned by power actuation through the bellows 70 all elements will move at the same rate for continuous application of pressure upon the fluid in the master cylinder 11. The reaction of the fluid under pressure in the master cylinder 11 on the end of the piston element 31 produces braking feel through the brake pedal 17.

If for any reason power movement of the bellows 70 causes rightward movement of the body 65 at a greater rate then the rate of movement of the brake pedal under control of the operator, or should the operator stop movement of the brake pedal 17, then the forward advancement of the body 65 relative to the piston 97 will cause closing off of the vacuum port 102 and reopening of the atmospheric pressure port 101 to cause air pressure to be introduced into the interior of the collapsible bellows 70 and thus stop further power movement of the piston element 30.

The valve 95 is thus a servo control for regulating power movement caused by collapsing of the bellows 70 in response to movement of the brake pedal 17.

It will thus be seen in the structure of the device hereinbefore disclosed that the power unit 10 can be placed on the floor wall of a motor vehicle on the passenger compartment side without using any space that was not heretofore fully utilized by the brake pedal operation. The master cylinder 11 is the only part of the power unit that extends into the engine compartment, thus greatly reducing the space required in the engine compartment for mounting of the power unit.

While the form of embodiment of the invention as herein disclosed constitutes a preferred form, it is to be understood that other forms might be adopted as may come within the scope of the claims which follow:

What is claimed is as follows:

1. A power unit for a hydraulic brake system, comprising, a support base, a master cylinder supported on one side of said base, piston means movable in said cylinder for producing hydraulic pressure in the brake system, a power element connected with said piston means in alignment therewith for power actuation thereof, said power element comprising a bellows structure forming a collapsible container receiving actuating fluid pressure, one end of said bellows structure being carried on the opposite side of said base, the opposite end of said bellows structure being pedal supported by a vehicle brake pedal and being free to move with the brake pedal for collapsing movement of the bellows and connected with said piston means for power actuation thereof, said bellows structure being aligned with said piston means, fluid flow control means for the actuating fluid carried on said base within said bellows structure and comprising valve means aligned with said piston means shiftable between separate passage means connected with a source of actuating pressure and a source of balancing pressure, said separate passage means each connecting respectively with a separate chamber in said free end of said bellows, one of said chambers being connected with a source of actuating pressure and the other chamber with a source of balancing pressure, a brake pedal operatively connected with said fluid flow control means for controlling actuation thereof, said brake pedal covering the free end of said bellows and movable concurrently therewith for controlled power operation of the power unit.

2. A power unit for a hydraulic brake system, comprising, a support base, a master cylinder supported on one side of said base, piston means movable in said cylinder for producing hydraulic pressure in the brake system, a power element connected with said piston means for power actuation thereof, said power element comprising a rubber-like accordion type bellows structure aligned with said piston means forming a collapsible container of quadrilateral cross section receiving actuating fluid pressure, one end of said bellows structure being carried on the opposite side of said base, the opposite end of said bellows structure being pedal supported by a vehicle brake pedal and being free to move with the brake pedal for collapsing movement of the bellows and connected with said piston means for power actuation thereof, first rigid closed loop frame members positioned in the maximum internal perimetral portions of the convolutions of said bellows and second open ended frame members positioned between opposite sides of adjacent convolutions and in the maximum internal perimetral portions thereof to prevent transverse collapsing of the convolutions but allowing free longitudinal contraction of the bellows, and fluid flow control means for the actuating fluid carried on said base within said bellows structure controlling operation of said power element.

3. A power unit for a hydraulic brake system, comprising, a support base, a master cylinder supported on one side of said base, piston means movable in said cylinder for producing hydraulic pressure in the brake system, a power element connected with said piston means for power actuation thereof, said power element comprising a rubber-like accordion type bellows structure aligned with said piston means forming a collapsible container receiving actuating fluid pressure, one end of said bellows structure being carried on the opposite side of said base, the opposite end of said bellows structure being pedal supported by a vehicle brake pedal and being free to move with the brake pedal for collapsing movement of the bellows and connected with said piston means for power actuation thereof, rigid closed loop frame members positioned in the convolutions of said bellows to prevent transverse collapsing thereof but allowing free longitudinal contraction of the bellows, other open ended rigid frame members positioned angularly between adjacent bellows convolutions, said other rigid frame members being arranged in pairs to substantially form an X whereby to prevent rotational twisting of the bellows structure, and fluid flow control means for the actuating fluid carried on said base controlling operation of said power element.

4. A power unit for a hydraulic brake system, comprising a support housing having a bore forming a chamber therein, a master cylinder supported on one end of said housing, piston means movable in said cylinder for producing hydraulic pressure in a brake system, a power element connected with said piston means for actuation thereof, said power element comprising a collapsible bellows structure forming a collapsible container for receiving actuating fluid, one end of said bellows structure being mounted on the opposite end of the said housing, the opposite end of said bellows structure being free for collapsing movement and connected with said piston means for actuation thereof, said opposite end of said bellows structure having guide means extending into said bore in sliding engagement therewith to provide for guided collapsing movement of said bellows structure, and valve means controlling flow of actuating fluids into said bellows structure to effect power movement thereof.

5. A power unit for a hydraulic brake system, comprising, a support housing having a bore forming a chamber, a master cylinder supported on one end of said housing, a power element comprising a collapsible bellows structure for receiving actuating fluids and valve means for control of the actuating fluids to the bellows structure supported on the opposite end of said housing, said collapsible bellows structure having a movable wall, piston plunger means extending from said movable wall through said bore into said master cylinder for displacement of fluid from the master cylinder upon actuation of said movable wall, and guide means extending from said movable wall into sliding engagement with said bore for guiding movement of the said wall.

6. A power unit for a hydraulic brake system, comprising, a support housing having a bore forming a chamber, a master cylinder supported on one end of said housing coaxial with said bore, a collapsible bellows structure supported on the opposite end of said housing coaxial with said bore with one end of said structure supported on said housing and the opposite end thereof being free to move, piston means in said cylinder, actuating means extending between said free end of said bellows structure and said piston means and extending through said bore coaxial therewith for actuation of said piston means upon movement of said free end of said bellows structure, control valve means interposed in the connection between said piston means and said free end of said bellows structure for actuation of the valve means for control of actuating fluids to within the bellows structure in response to movement of the free end of the bellows structure, and guide means extending from said free end of said bellows structure and surrounding said control valve means and said actuating means into sliding engagement with said bore for guiding movement of said bellows structure coaxial with said bore.

References Cited in the file of this patent

UNITED STATES PATENTS

| | | |
|---|---|---|
| 2,207,700 | Porter | July 16, 1940 |
| 2,445,862 | Price | July 27, 1948 |
| 2,592,221 | Whitted | Apr. 8, 1952 |
| 2,745,383 | Hupp | May 15, 1956 |
| 2,761,427 | Shumaker | Sept. 4, 1956 |